US009243755B2

(12) United States Patent
Lawrence et al.

(10) Patent No.: US 9,243,755 B2
(45) Date of Patent: Jan. 26, 2016

(54) METHODS FOR AN EXHAUST FLUID LEVEL SENSOR

(75) Inventors: Don M. Lawrence, Birmingham, MI (US); Scott Donald Cooper, Ann Arbor, MI (US); Dwayne Pollitt, Novi, MI (US); Jimmy Zhu, Ann Arbor, MI (US); David T. Zultowski, Plymouth, MI (US); Scott J. Szymusiak, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1083 days.

(21) Appl. No.: 13/300,410

(22) Filed: Nov. 18, 2011

(65) Prior Publication Data

US 2013/0125997 A1    May 23, 2013

(51) Int. Cl.
*F17D 3/00* (2006.01)
*G01F 23/00* (2006.01)
*F01N 3/20* (2006.01)

(52) U.S. Cl.
CPC ............... *F17D 3/00* (2013.01); *F01N 3/2066* (2013.01); *G01F 23/00* (2013.01); *F01N 2610/142* (2013.01); *F01N 2610/148* (2013.01); *F01N 2900/1814* (2013.01); *Y02T 10/24* (2013.01); *Y10T 137/0324* (2015.04)

(58) Field of Classification Search
CPC ... F01N 3/2066; F01N 2610/02; F01N 3/035; F01N 13/009; F01N 3/208; F01N 3/18; F01N 2610/10; F01N 3/2892; F01N 11/00; F01N 2610/148; F01N 2900/1814; F01N 2610/142; G01F 23/00; G01F 22/00; G01F 25/0061; G01F 25/0084; F17D 3/00; Y10T 137/0324; Y02T 10/24
USPC .............. 73/290 R, 304 C, 149, 1.73, 304 R
See application file for complete search history.

(56) References Cited

U.S. PATENT DOCUMENTS

| 6,063,350 | A  | *  | 5/2000  | Tarabulski et al. ......... 423/239.1 |
| 6,554,031 | B2 |    | 4/2003  | Channing |
| 8,079,245 | B1 | *  | 12/2011 | Owens et al. ................. 73/1.73 |
| 8,538,591 | B1 | *  | 9/2013  | Klughart ....................... 700/281 |
| 2008/0245130 | A1 | * | 10/2008 | Wang et al. ................... 73/1.73 |
| 2009/0301067 | A1 |   | 12/2009 | Dingle et al. |
| 2010/0107615 | A1 | * | 5/2010  | Chmielewski et al. ......... 60/303 |
| 2010/0129091 | A1 | * | 5/2010  | Amann ............. G03G 15/0856 399/27 |
| 2010/0200107 | A1 |   | 8/2010  | Weathers et al. |
| 2010/0326186 | A1 | * | 12/2010 | Kamp et al. ................. 73/304 C |
| 2011/0271754 | A1 | * | 11/2011 | Ross et al. ..................... 73/295 |
| 2011/0309087 | A1 | * | 12/2011 | Hodgson et al. .............. 220/562 |
| 2012/0072109 | A1 | * | 3/2012  | Waite et al. ................... 701/431 |
| 2012/0123630 | A1 | * | 5/2012  | King et al. ................... 701/29.4 |
| 2013/0000760 | A1 | * | 1/2013  | Crary ........................ 137/565.17 |
| 2013/0199160 | A1 | * | 8/2013  | Kruer et al. ..................... 60/274 |
| 2014/0033683 | A1 | * | 2/2014  | Wei et al. ........................ 60/274 |

* cited by examiner

*Primary Examiner* — Hezron E Williams
*Assistant Examiner* — Marrit Eyassu
(74) *Attorney, Agent, or Firm* — Julia Voutyras; Alleman Hall McCoy Russell & Tuttle LLP

(57) ABSTRACT

Various methods are provided for notifying a vehicle operator of various parameters based on an exhaust fluid level sensor of an exhaust fluid storage tank. In one example, the parameter is a consumption rate of the exhaust fluid. In another example, the parameter is an amount of fluid to be added to the exhaust fluid storage tank.

17 Claims, 5 Drawing Sheets

METHODS FOR AN EXHAUST FLUID LEVEL SENSOR

TECHNICAL FIELD

The present application relates to methods and systems for a vehicle system which includes an exhaust gas treatment system with an exhaust fluid level sensor disposed in an exhaust fluid storage tank.

BACKGROUND AND SUMMARY

Vehicle systems may include an engine with an exhaust gas treatment system coupled in its exhaust passage in order to control regulated emissions. In some examples, the exhaust gas treatment system may include a selective catalytic reduction (SCR) system in which an exhaust fluid, such as urea or ammonia, is added to the exhaust stream upstream of a catalyst such that $NO_x$ may be reduced by the catalyst. In such an example, the exhaust fluid may be held in an exhaust fluid storage tank which is periodically refilled. In some approaches, the exhaust fluid storage tank may be filled via a dispenser which includes an automatic shut-off of fluid flow such that the exhaust fluid storage tank is not overfilled. For example, a current level of exhaust fluid may be unknown, as a level sensor may only indicate if the exhaust fluid is above or below a threshold level.

The inventors herein have recognized the above issue and have devised an approach to at least partially address it. In one example, a method for a vehicle system includes sensing throughout a range an exhaust fluid level in an exhaust fluid storage tank, and notifying a vehicle operator of a parameter based on the sensed exhaust fluid level.

By sensing the exhaust fluid level throughout a range, such as from a near empty exhaust fluid level to a near full exhaust fluid level, various information regarding the exhaust fluid storage tank may be determined. For example, the parameter which is determined may be an exhaust fluid consumption rate or an amount of exhaust fluid to be added to the exhaust fluid storage tank. Further, the operator of the vehicle may be notified of the parameter via a display such that appropriate action may be taken. For example, when the amount of exhaust fluid to be added to the exhaust fluid storage tank is displayed on a dashboard of the vehicle, the operator may add an amount of exhaust fluid to the exhaust fluid storage tank such that the exhaust fluid storage tank is filled to a maximum level without overfilling the exhaust fluid storage tank. In one example, the exhaust fluid may be added to the exhaust fluid storage tank from a vessel such as a bottle without an automatic fluid flow shut-off. In such an example, the vehicle operator may pour a quantity of exhaust fluid into the exhaust fluid storage tank based on the sensed exhaust fluid level with a reduced possibility of overfilling the exhaust fluid storage tank.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to various embodiments of methods for a vehicle system which includes an exhaust fluid level sensor. In one example embodiment, a method comprises sensing throughout a range an exhaust fluid level in an exhaust fluid storage tank, and notifying an operator of a vehicle of the vehicle system of a parameter based on the sensed exhaust fluid level. Examples of the parameter include, an exhaust fluid consumption rate, a time to empty based on the exhaust fluid consumption rate, a maximum fill amount, and a maximum fill amount based on an ambient temperature. Each of the parameters may be displayed individually or in some combination to an operator of the vehicle via a vehicle display in order to notify the vehicle operator of the parameter, for example.

Figure 1:
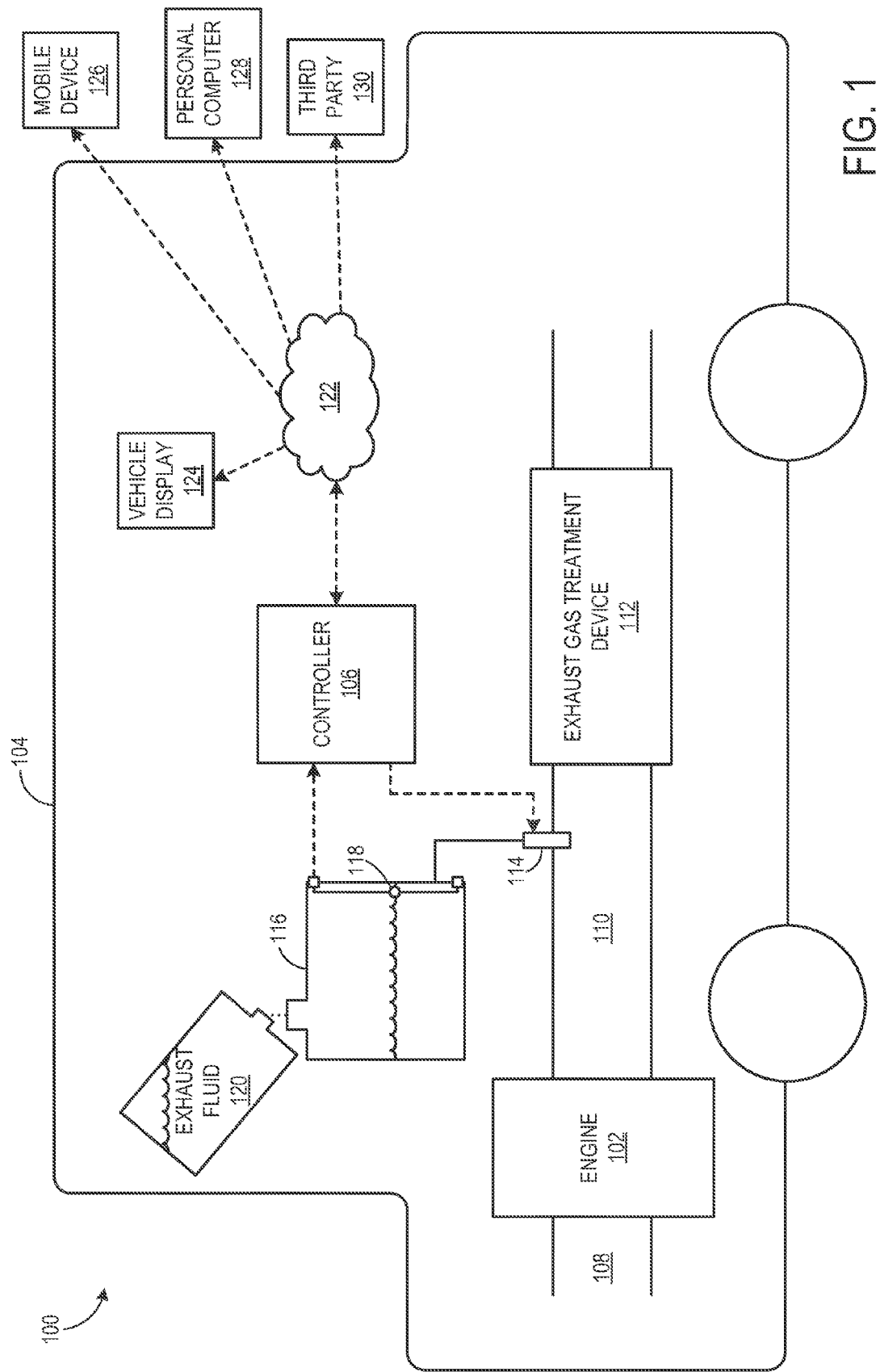
FIG. 1 shows a schematic diagram of a vehicle system including an exhaust treatment system with one exhaust fluid storage tank.

FIG. 1 shows a schematic diagram of a vehicle system 100. Vehicle system 100 includes engine 102 which may be included in a propulsion system of vehicle 104. Engine 102 may be controlled at least partially by a control system including controller 106 and by input from a vehicle operator via an input device (not shown). Intake air is inducted into engine 102 via intake passage 108, an exhaust gas resulting from combustion in engine 102 is exhausted via exhaust passage 110 eventually leading to a tailpipe (not shown) that eventually routes exhaust gas to the atmosphere.

As shown, an exhaust gas treatment system including exhaust gas treatment device 112 is shown arranged along exhaust passage 110. In the example embodiment of FIG. 1, exhaust gas treatment device 112 may be a selective catalyst reduction (SCR) system, for example. In other examples, the exhaust gas treatment system may additionally or alternatively include a three way catalyst (TWC), a $NO_x$ trap, various other emission control devices, or combinations thereof. Further, as depicted, exhaust fluid injector 114 is disposed upstream of exhaust gas treatment device 112. Exhaust fluid injector 114 injects an exhaust fluid into the exhaust stream for reaction with $NO_x$ in exhaust gas treatment device 112 responsive to signals received from controller 106. The exhaust fluid may be a reductant, for example, such as urea or ammonia.

Exhaust fluid injector 114 is supplied with exhaust fluid from exhaust fluid storage tank 116. Exhaust fluid storage tank 116 may be a reservoir suitable for holding the exhaust fluid throughout a range of temperatures, for example. As depicted in FIG. 1, exhaust fluid storage tank 116 includes an exhaust fluid level sensor 118. Exhaust fluid level sensor 118 may provide discreet exhaust fluid level readings to controller 106, for example. However, exhaust fluid level sensor 118 may effectively be a continuous level sensor by providing a relatively large number of discrete readings in a range from a near empty exhaust fluid level to a near full exhaust fluid level. In this manner, exhaust fluid level sensor 118 may provide an instantaneous indication of exhaust fluid level to controller 106 when the exhaust fluid level is within the near empty to near full range of exhaust fluid level sensor. The exhaust fluid level sensor may be a magneto strictive level sensor or a resistive chain level sensor, for example. Based on measurements of the exhaust fluid level sensor, various parameters may be determined, such as an exhaust fluid consumption rate and an amount of exhaust fluid that should be added to the exhaust fluid storage tank, as will be described in greater detail below with reference to FIGS. 2-5.

In the example embodiment depicted in FIG. 1, exhaust fluid is shown being poured into exhaust fluid storage tank 116 from exhaust fluid bottle 120. Because exhaust fluid level sensor 118 may be used to indicate to an operator of vehicle 104 an amount of exhaust fluid to be added to exhaust fluid storage tank 116 or a maximum fill amount of exhaust fluid storage tank 116, a chance of adding too much exhaust fluid to exhaust fluid storage tank 116 is reduced. As such, bottles which do not offer an automatic shut-off of fluid flow when the exhaust fluid storage tank is full may be used to add exhaust fluid to the exhaust fluid storage tank. In other examples, pumps/nozzles without an automatic shut-off of fluid flow may be used to fill exhaust fluid storage tank 116 with a reduced possibility of overfilling.

Controller 106 may be a microcomputer including the following, although not shown in FIG. 1: a microprocessor unit, input/output ports, an electronic storage medium for executable programs and calibration values (e.g., a read only memory chip), random access memory, keep alive memory, and a data bus. Storage medium read-only memory may be programmed with computer readable data representing instructions executable by the microprocessor for performing the methods described below as well as other variants that are anticipated but not specifically listed. For example, the controller may receive communication (e.g., input data) from the various sensors, process the input data, and trigger the actuators in response to the processed input data based on instruction or code programmed therein corresponding to one or more routines. Example routines are described herein with reference to FIGS. 2-5.

Controller 106 sends signals to communications system 122, such as a wireless network or controller area network (CAN). For example, after processing data from exhaust fluid level sensor 118 and estimating a parameter, such as an average exhaust fluid consumption rate, controller 106 sends a message to communications system 122 indicating the parameter. Communications system 122 may then notify the operator of vehicle 104 via a display. In one example, the parameter may be displayed on vehicle display 124, such as a dashboard or other vehicle display. In another example, communications system 122 may send a message regarding the parameter to mobile device 126 of the operator in the form of a text message, for example, or to personal computer 128 in the form of an email. As yet another example, communications system 122 may additionally or alternatively send a message to a third party 130, such a selling dealership of vehicle 104 or another service center.

Thus, the vehicle system includes an exhaust gas treatment system which includes an exhaust fluid storage tank with an exhaust fluid sensor. The exhaust fluid sensor measures an exhaust fluid level throughout a range from a near empty fluid level to a near full fluid level and sends a signal to the controller indicating the exhaust fluid level. As will be described below, the controller may estimate a parameter based on the exhaust fluid level sensor readings and notify the operator of the vehicle of the parameter.

FIGS. 2-5 show flow charts illustrating routines for notifying an operator of a vehicle of various information regarding an exhaust fluid storage tank based on a level sensor disposed in the exhaust fluid storage tank, such as exhaust fluid level sensor 118 disposed in exhaust fluid storage tank 116 described above with reference to FIG. 1. For example, the operator may be notified of a usage rate of the exhaust fluid, an estimated time to empty of the exhaust fluid storage tank, an amount to be added to the exhaust fluid storage tank to fill the exhaust fluid storage tank, and a fill amount based on ambient temperature. In the example routines described below with reference to FIGS. 2-5, urea is used as an example exhaust fluid. It should be understood, however, that the routines may be applied to any other suitable exhaust fluid.

Figure 2:
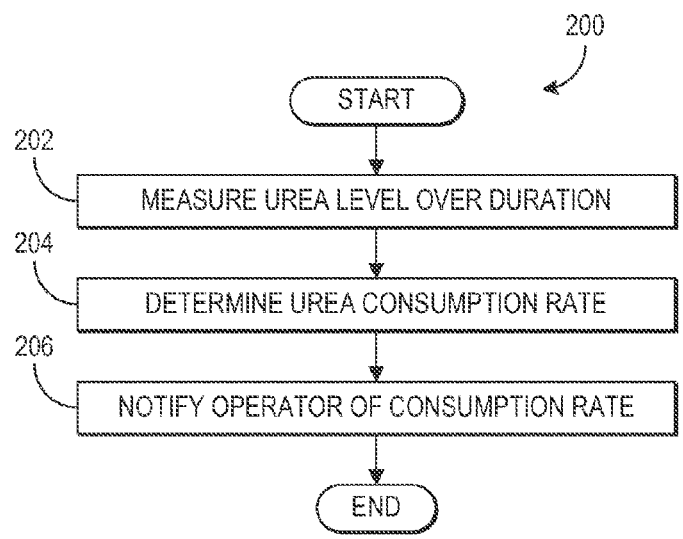
FIG. 2 shows a flow chart illustrating a routine for displaying a consumption rate of an exhaust fluid.

FIG. 2 shows a flow chart illustrating a routine 200 for displaying a consumption rate, or usage rate, of urea to an operator of a vehicle.

At 202 of routine 200, the urea level is measured over a duration. For example, the urea level may be measured by a urea level sensor, such as the exhaust fluid level sensor described above with reference to FIG. 1. In one example, the urea level sensor may send a signal indicating a urea level to a controller at predetermined intervals throughout a duration. For example, the urea level sensor may send a signal indicating the urea level to the controller every time the vehicle is started, every time the vehicle is shutdown, after every 10, 15, 20, 30, or another desired number of minutes of vehicle operation, or the like. Further, the duration may be a number of days, weeks, or months, for example.

Based on the urea levels measured by the urea level sensor throughout the duration, the controller determines a urea consumption rate at 204. The urea consumption rate may be an average consumption rate, for example. As an example, the urea consumption rate may be a volume of urea used per unit of time. For example, the consumption rate may be a number of milliliters per day, liters per month, etc. In some examples, the vehicle operator may choose the units in which the consumption rate is calculated or communicated to the operator.

Once the urea consumption rate is determined, the operator of the vehicle is notified of the consumption rate. For example, the consumption rate may be displayed on a dashboard of the vehicle via an indicator light. In some examples, the operator may be notified of the urea consumption rate via a communications system, such as WIFI, Bluetooth, SYNC, or the like. For example, the controller may send a message to the operator via the communications system. The message may be displayed on a vehicle display on the dashboard or another location of the vehicle, sent to a mobile device of the operator (e.g., via a text message), emailed to the operator, etc.

In other examples, the controller may additionally or alternatively send a message via the communications system notifying a third party of the urea consumption rate. For example, the third party may be a vehicle dealership at which the operator purchased the vehicle and/or to which the operator takes the vehicle for service, or the third party may be another vehicle service center. The third party may keep a record of the urea consumption rate of the vehicle, for example.

In this way, the urea consumption rate may be estimated by the urea level sensor. Once the controller determines the urea consumption rate, the operator of the vehicle may be notified of the urea consumption rate directly by the controller via a display in the vehicle, or a message sent to a suitable computing device such as a mobile device or personal computer. The user may also be notified of the consumption rate via a third party, such as the vehicle dealership.

Figure 3:
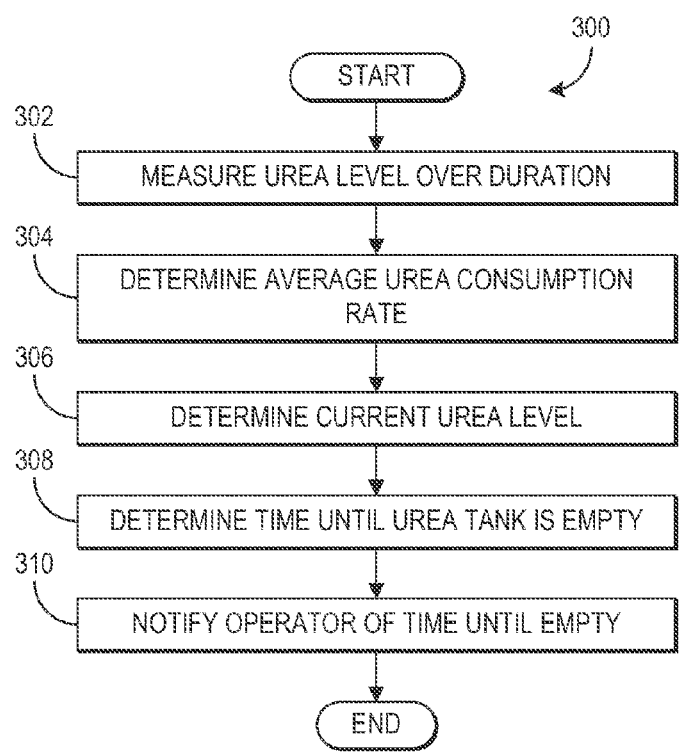
FIG. 3 shows a flow chart illustrating a routine for displaying a time to empty of an exhaust fluid.

FIG. 3 shows a flow chart illustrating a routine 300 for displaying a time until empty of a urea storage tank to an operator of a vehicle.

At 302, the urea level is measured over a duration. As described above, the urea level may be measured by a urea level sensor, such as the exhaust fluid level sensor described above with reference to FIG. 1. In one example, the urea level sensor may send a signal indicating a urea level to a controller at predetermined intervals throughout a duration. For example, the urea level sensor may send a signal indicating the urea level to the controller every time the vehicle is started, every time the vehicle is shutdown, after every 10, 15, 20, 30, or another desired number of minutes of vehicle operation, or the like. Further, the duration may be a number of days, weeks, or months, for example.

Once the urea level is measured, an average urea consumption rate is determined at 304. As an example, the urea consumption rate may be a volume of urea used per unit of time. For example, the consumption rate may be a number of milliliters per day, liters per month, etc. In some examples, the vehicle operator may choose the units in which the consumption rate is calculated or communicated to the operator. The average urea consumption rate may be the same consumption rate as estimated and displayed to the vehicle operator in routine 200 of FIG. 2, for example.

At 306 of routine 300, the current urea level is determined. For example, the urea level sensor may send an instantaneous indication of the urea level to the controller. Based on the current (e.g., instantaneous) urea level and the average consumption rate determined at 304, a time or range until the urea storage tank is empty is determined at 308. As an example, a time until the urea storage tank is empty may be estimated in days, months, years, etc.

Once the time to empty of the current exhaust fluid quantity is determined, routine 300 proceeds to 310 where the operator of the vehicle is notified of the time until empty. For example, the time until empty may be displayed on a dashboard of the vehicle via an indicator light. In some examples, the operator may be notified of the time until the urea storage tank is empty via a communications system, such as WIFI, Bluetooth, SYNC, or the like. For example, the controller may send a message to the operator via the communications system. The message may be displayed on a vehicle display on the dashboard or another location of the vehicle, sent to a mobile device of the operator (e.g., via a text message), emailed to the operator, etc.

In other examples, the controller may send a message indicating the time until the urea storage tank is empty via the communications system which notifies a third party. For example, the third party may be a vehicle dealership at which the operator purchased the vehicle and/or to which the operator takes the vehicle for service, or the third party may be another vehicle service center. The third party may notify the operator that service is needed at a predetermined time before the urea storage tank runs out of urea, for example, such that the operator can bring the vehicle in to have the urea storage tank filled.

Thus, the urea level sensor may indicate a level of urea such that an average urea consumption rate may be calculated and an estimated time or range until the urea storage tank is empty may be determined. The operator of the vehicle may then be notified of the time until the urea storage tank is empty via a display in the vehicle, or a message sent to a suitable computing device such as a mobile device or personal computer. The user may also be notified of the time until the storage tank is empty via a third party, such as the vehicle dealership.

Figure 4:
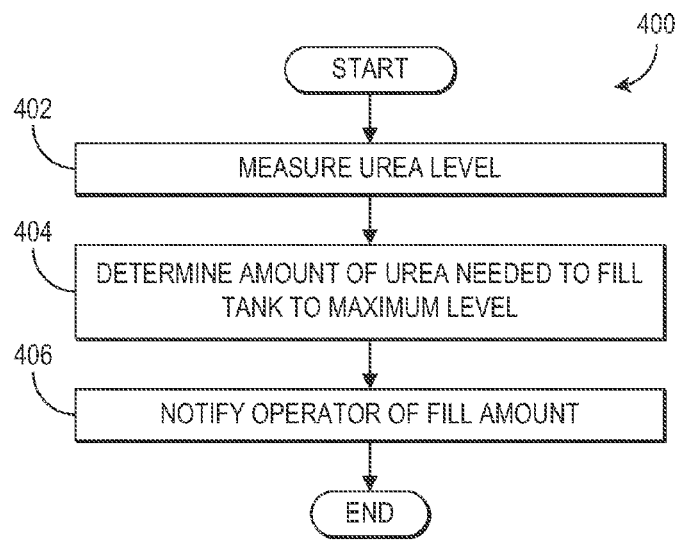
FIG. 4 shows a flow chart illustrating a routine for displaying an amount of exhaust fluid to be added to an exhaust fluid storage tank.

FIG. 4 shows a flow chart illustrating a routine 400 for displaying a fill amount of a urea storage tank to an operator of a vehicle.

At 402 of routine 400, the urea level is measured. For example, the urea level may be measured by a urea level sensor, such as the exhaust fluid level sensor described above with reference to FIG. 1. In one example, the controller may request an indication of the urea level from the urea level sensor. In another example, the urea level sensor may send a signal indicating a urea level to a controller at predetermined intervals and the controller may use the urea level from the last urea level sensor reading.

Once the urea level is measured, routine 400 proceeds to 404 where an amount of urea needed to fill the urea storage tank to a maximum level is determined. As an example, the controller may have stored a maximum fill level of the urea storage stored. Based on the urea level determined at 402, the controller may calculate an amount of urea to be added to the urea storage tank to fill the urea storage tank to a maximum fill level. In other words, the controller may determine a maximum fill amount of urea.

At 406, the vehicle operator is notified of the amount of urea to be added to the urea storage tank. For example, the maximum fill amount of urea may be displayed on a dashboard of the vehicle via an indicator light. In some examples, the operator may be notified of the maximum fill amount via a communications system, such as WIFI, Bluetooth, SYNC, or the like. For example, the controller may send a message to the operator via the communications system. The message may be displayed on a vehicle display on the dashboard or another location of the vehicle, sent to a mobile device of the operator (e.g., via a text message), emailed to the operator, etc.

In other examples, the controller may additionally or alternatively send a message via the communications system notifying a third party of the amount of urea to be added to the urea storage tank. For example, the third party may be a vehicle dealership at which the operator purchased the vehicle and/or to which the operator takes the vehicle for service, or the third party may be another vehicle service center. In such an example, the third party may use the maximum fill amount to add the correct amount of urea to the urea storage tank without overfilling the urea storage tank.

In some examples, the vehicle operator (and/or third party) may fill the urea storage tank with a bottle that does not have an automatic fluid flow shut-off. In some embodiments, the vehicle operator may input the volume of the bottle via an interactive display or the like. For example, the vehicle operator may input that the bottle contains 1 liter of urea. The controller may then calculate the amount of the urea needed to fill the urea storage tank based on the urea level indicated by the urea level sensor. As an example, the controller may determine ½ liter of urea should be added to the urea storage tank to fill the tank, and the amount to be added may be displayed to the vehicle operator. The display may further indicate that the amount of urea needed to fill the urea storage tank is half of the bottle.

Thus, an amount of urea to be added to the urea storage tank may be determined based on the urea level sensor and the vehicle operator or a third party may be notified of the amount. In this way, the urea storage tank may be filled with urea without over filling the urea storage tank and spilling urea. For example, by knowing the maximum amount of urea to add to the urea storage tank, the urea storage tank may be filled by bottles that do not have an automatic shut-off of fluid flow, as described above with reference to FIG. 1.

Figure 5:
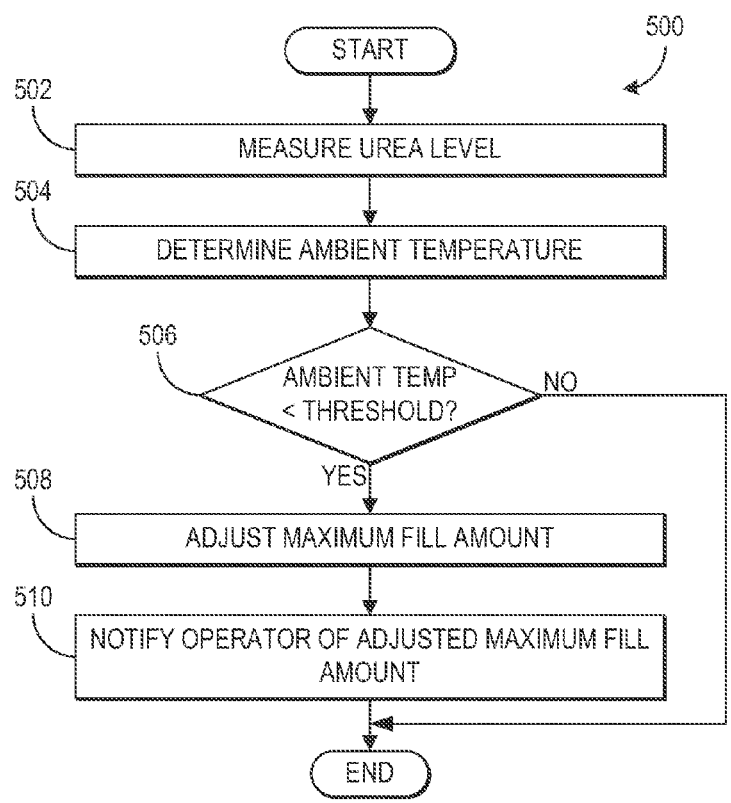
FIG. 5 shows a flow chart illustrating a routine for displaying an amount of fluid to be added to an exhaust fluid storage tank based on an ambient temperature.

FIG. 5 shows a flow chart illustrating a routine 500 for displaying a fill amount of a urea storage tank based on an ambient temperature to an operator of a vehicle.

At 502 of routine 500, the urea level is measured. For example, the urea level may be measured by a urea level sensor, such as the exhaust fluid level sensor described above with reference to FIG. 1. In one example, the controller may request an indication of the urea level from the urea level sensor. In another example, the urea level sensor may send a signal indicating a urea level to a controller at predetermined intervals and the controller may use the urea level from the last urea level sensor reading.

An ambient temperature is determined at 504 of routine 500. The ambient temperature may be measured by any suitable temperature sensor which is exposed to ambient air surrounding the vehicle, for example. Once the ambient temperature is determined, routine 500 proceeds to 506 where it is determined if the ambient temperature is less than a threshold temperature. As an example, the threshold temperature may be a freezing point of the urea (if aqueous urea is used). As such, if the ambient temperature is less than the threshold temperature, the urea may freeze during periods when the vehicle is not in operation and the urea is not warmed. If it is determined that the ambient temperature is greater than the threshold temperature, the routine ends.

On the other hand, if it is determined that the ambient temperature is less than the threshold temperature, routine 500 continues to 508 where the maximum fill amount of the urea storage tank is adjusted. For example, the maximum fill amount, and thus the amount of urea to be added to the urea storage tank, may be reduced such that degradation of the urea storage tank and system does not occur due to the relatively low ambient temperature when the vehicle is not in operation.

Once the maximum fill amount is adjusted, routine 500 proceeds to 510 where the vehicle operator is notified of the adjusted maximum fill amount. For example, the adjusted maximum urea fill amount may be displayed on a dashboard of the vehicle via an indicator light. In some examples, the operator may be notified of the adjusted urea fill amount via a communications system, such as WIFI, Bluetooth, SYNC, or the like. For example, the controller may send a message to the operator via the communications system. The message may be displayed on a vehicle display on the dashboard or another location of the vehicle, sent to a mobile device of the operator (e.g., via a text message), emailed to the operator, etc.

In other examples, the controller may additionally or alternatively send a message via the communications system notifying a third party of the adjusted maximum urea fill amount. For example, the third party may be a vehicle dealership at which the operator purchased the vehicle and/or to which the operator takes the vehicle for service, or the third party may be another vehicle service center. The third party may use the adjusted maximum fill amount to add the correct amount of urea to the urea storage tank without filling the urea storage tank too much such that if freezing of the urea occurs, degradation of the urea storage tank may occur.

Thus, an amount of urea to be added to the urea storage tank may be adjusted based on the ambient temperature and the vehicle operator or a third party may be notified of the adjusted amount. In this manner, the urea storage tank may be filled with urea without adding so much urea that degradation of the urea storage tank is possible during conditions where the ambient temperature it relatively low.

Figure 6:
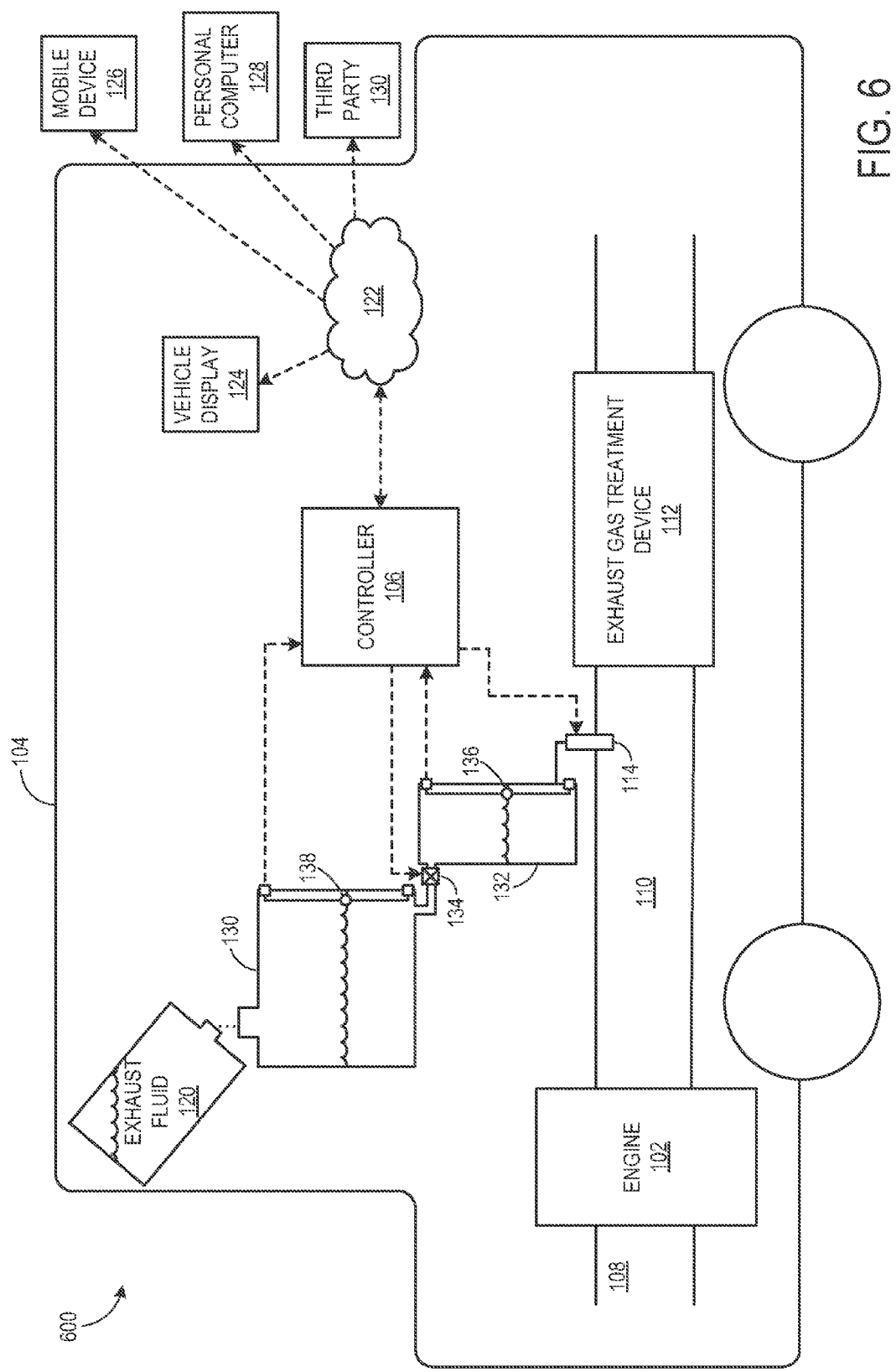
FIG. 6 shows a schematic diagram of a vehicle system including an exhaust gas treatment system with two exhaust fluid storage tanks.

Continuing to FIG. 6, a schematic diagram of a vehicle system 600 including first exhaust fluid storage tank 130 and second exhaust fluid storage tank 132 is shown. Vehicle system 600 includes several similar elements as vehicle system 100 described above with reference to FIG. 1. Like elements are labeled with like reference numerals and may not be described again.

In the example embodiment of FIG. 6, first exhaust fluid storage tank 130 may hold a greater volume of exhaust fluid than second exhaust fluid storage tank 132. The exhaust fluid may be a reductant, such as aqueous urea or ammonia, for example. As a non-limiting example, first exhaust fluid storage tank 130 may hold at least 10 liters of exhaust fluid and second exhaust fluid storage tank 132 may hold 1-2 liters of exhaust fluid. In such a configuration, second exhaust fluid storage tank 132 may supply exhaust fluid to injector 114 and first exhaust fluid storage tank 130 may supply second exhaust fluid storage tank 132 with exhaust fluid. For example, controller 106 may actuate valve 134 to open such that exhaust fluid can flow to second exhaust fluid storage tank 132 from first exhaust fluid storage tank, as desired. As will be described in greater detail below with reference to FIG. 8, first exhaust fluid storage tank 130 may fill second exhaust gas storage tank 132 when an exhaust fluid level in second exhaust fluid storage tank 132 falls below a threshold level.

The exhaust fluid level in second exhaust fluid storage tank 132 may be determined based on second exhaust fluid level sensor 136, for example. Likewise, the exhaust fluid level in first exhaust fluid storage tank 130 may be determined based on first exhaust fluid level sensor 138. In some embodiments, first exhaust fluid level sensor 138 and second exhaust fluid level sensor 136 may each effectively be continuous level sensors by providing a relatively large number of discrete readings in a range from a near empty exhaust fluid level to a near full exhaust fluid level. In this manner, first and second exhaust fluid level sensors 138 and 136 may provide instantaneous indications of exhaust fluid levels in first exhaust fluid storage tank 130 and second exhaust fluid storage tank 132, respectively, to controller 106 when the exhaust fluid level is within the near empty to near full range of the exhaust fluid level sensors. The exhaust fluid level sensors may be magnetostrictive level sensor or resistive chain level sensors, for example. As described above with reference to FIGS. 2-5, based on measurements of the exhaust fluid level sensors, various parameters may be determined, such as exhaust fluid consumption rates and an amount of exhaust fluid that should be added to each of the exhaust fluid storage tanks.

In another embodiment, exhaust fluid level sensor 136 of second exhaust fluid storage tank 132 may be a discrete level sensor which provides exhaust fluid level readings at predetermined levels. As such, there may be large gaps between exhaust fluid level measurements. Based on a flow of exhaust fluid from second exhaust fluid storage tank 132 and the last exhaust fluid level reading from the exhaust fluid sensor 136, however, controller 106 may determine an exhaust fluid level of exhaust fluid storage tank 132, as will be described in greater detail below with reference to FIG. 7. In this manner, a less expensive discrete level sensor may be used in the second exhaust fluid storage tank instead of a more expensive effectively continuous level sensor, thereby reducing cost of the system.

As described above with reference to exhaust fluid storage tank 116 in FIG. 1, first exhaust fluid storage tank 130 may be filled by pouring exhaust fluid from an exhaust fluid bottle 120 into first exhaust fluid storage tank 130, as shown in FIG. 6. Because first exhaust fluid level sensor 138 may be used to indicate to an operator of vehicle 104 an amount of exhaust fluid to be added to exhaust fluid storage tank 116 or a maximum fill amount of first exhaust fluid storage tank 130, a chance of adding too much exhaust fluid to first exhaust fluid storage tank 130 is reduced. As such, bottles which do not offer an automatic shut-off of fluid flow when the exhaust fluid storage tank is full may be used to add exhaust fluid to the first exhaust fluid storage tank. In other examples, pumps/nozzles without an automatic shut-off of fluid flow may be used to fill first exhaust fluid storage tank 130 with a reduced possibility of overfilling.

Thus, vehicle system 600 includes first exhaust fluid storage tank 130 and second exhaust fluid storage tank 132. First exhaust fluid storage tank 130 may hold a greater quantity of exhaust fluid than second exhaust fluid storage tank 132 and may supply second exhaust fluid storage tank 132 with exhaust fluid, for example. Further, each of first exhaust fluid storage tank 130 and second exhaust fluid storage tank 132 include an exhaust fluid level sensor. At least exhaust fluid level sensor 138 disposed in first exhaust fluid storage tank 130 may be an effectively continuous level sensor such that various information regarding first exhaust fluid storage tank 130 may be determined, as described above with reference to FIGS. 2-5.

Figure 7:
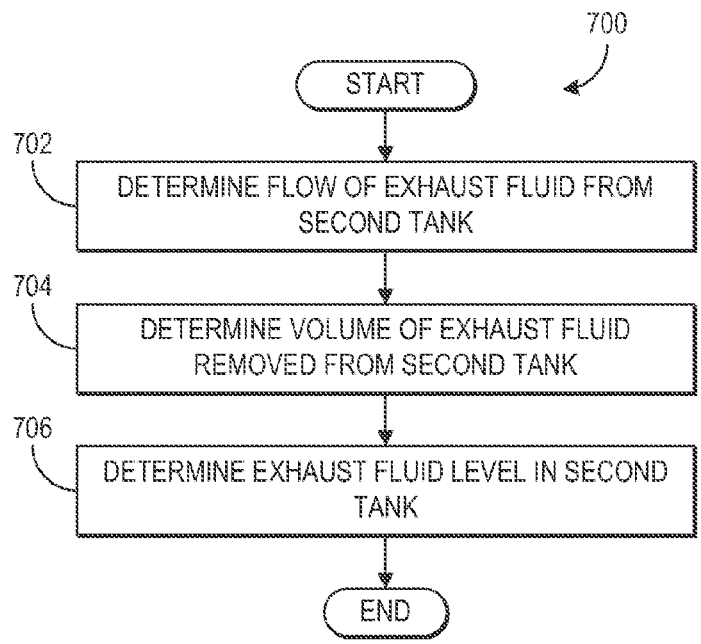
FIG. 7 shows a flow chart illustrating a routine for estimating an exhaust fluid level in a second exhaust fluid storage tank.
Figure 8:
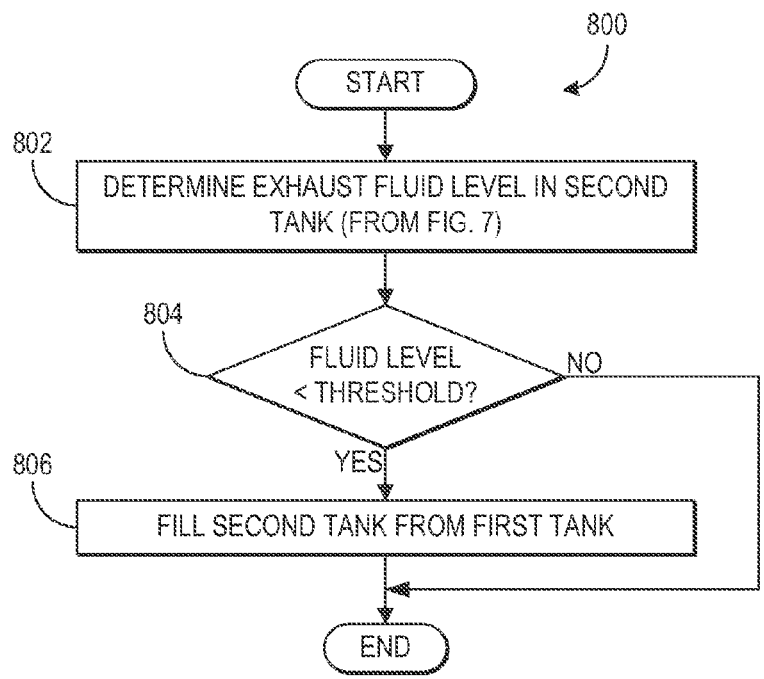
FIG. 8 shows a flow chart illustrating a routine for filling a second exhaust fluid storage tank from a first exhaust fluid storage tank.

FIGS. 7 and 8 show flow charts illustrating routine for a vehicle system, such as vehicle system 600 described above with reference to FIG. 6. FIG. 7 shows a flow chart illustrating a routine for determining an exhaust fluid level in a second exhaust fluid storage tank, such as second exhaust fluid storage tank 132 described above with reference to FIG. 6, that is filled by a first exhaust fluid storage tank. FIG. 8 shows a flow chart illustrating a routine for filling the second exhaust fluid storage tank from the first exhaust fluid storage tank based on the exhaust fluid level of the second exhaust fluid storage tank determined by the routine of FIG. 7.

Continuing to FIG. 7, a flow chart illustrating a routine 700 for estimating a level of exhaust fluid in a second exhaust fluid storage tank is shown. For example, the second exhaust fluid storage tank may provide exhaust fluid to an injector for delivery to an exhaust passage of an engine, and the second exhaust fluid storage tank may be filled by a first exhaust fluid storage tank which holds a larger volume of exhaust fluid than the second exhaust fluid storage tank, such as in the example of vehicle system 600 described above with reference to FIG. 6. Specifically, the routine determines the exhaust fluid level based on exhaust fluid flow from the second exhaust fluid storage tank, such as when the second exhaust fluid storage tank only includes a discrete level sensor with a limited exhaust fluid level output and not an effectively continuous level sensor.

At 702 of routine 700, a flow of exhaust fluid from the second exhaust fluid storage tank is determined. As an example, the exhaust fluid flow may be calculated or summated as it is commanded by the controller.

At 704, a volume of exhaust fluid removed from the second exhaust fluid storage tank is determined. For example, the controller may estimate the volume of fluid based on the flow of exhaust fluid from the second exhaust fluid storage tank and a duration of flow.

At 706, the exhaust fluid level in the second exhaust fluid storage tank is determined. The exhaust fluid level may be estimated based on the volume of fluid removed from the second exhaust fluid storage tank and the last indicated level of the second exhaust fluid storage tank, for example.

Thus, the exhaust fluid level of the second exhaust fluid storage tank may be determined even when an effectively continuous exhaust fluid level sensor is not present in the second exhaust fluid storage tank. The first exhaust fluid storage tank may fill the second exhaust fluid storage tank based on the exhaust fluid level of the second exhaust fluid storage tank, as will be described in greater detail below.

FIG. 8 shows a routine 800 for filling the second exhaust fluid storage tank from the first exhaust fluid storage tank. Specifically, the first exhaust fluid storage tank fills the second exhaust fluid storage tank based on an exhaust fluid level of the second exhaust fluid storage tank, such as the exhaust fluid level determined by routine 700 of FIG. 7.

At 802 of routine 800, the exhaust fluid level of the second tank is determined. In one example, the exhaust fluid level of the second exhaust fluid storage tank may be determined as described above with reference to FIG. 7, such as when the second exhaust fluid storage tank includes a level sensor that provides limited exhaust fluid level measurements. In other examples, the exhaust fluid level of the second exhaust fluid storage tank may be provided by an effectively continuous level sensor disposed in the second exhaust fluid storage tank.

Once the exhaust fluid level in the second exhaust fluid storage tank is determined, the routine proceeds to 804 where it is determined if the exhaust fluid level of the second exhaust fluid storage tank is less than a threshold level. The threshold level may be a minimum desired level of exhaust fluid or a level below which the exhaust fluid level sensor can determine the exhaust fluid level, for example. If it is determined that the exhaust fluid level in the second exhaust fluid storage tank is greater than the threshold level, the routine ends.

On the other hand, if it is determined that the exhaust fluid level in the second exhaust fluid storage tank is less than the threshold level, routine 800 continues to 806 where the second exhaust fluid storage tank is filled from the first exhaust fluid storage tank. For example, a valve may be actuated by the controller in order to allow a flow of fluid from the first exhaust fluid storage tank to the second exhaust fluid storage tank. In other examples, a pump may be additionally or alternatively turned on to draw fluid from the first exhaust fluid storage tank so that it may be supplied to the second exhaust fluid storage tank.

Once the second exhaust fluid storage tank is filled, a level of the first exhaust fluid storage tank may be measured and a vehicle operator may be notified of the change in exhaust fluid level of the first exhaust fluid storage tank via a vehicle display or the like. Further, in one example, a consumption rate of the exhaust fluid may be determined based on amount of exhaust fluid that is supplied to the second exhaust fluid storage tank and a duration between subsequent filling.

Thus, the second exhaust fluid storage tank may supply the second exhaust fluid storage tank with exhaust fluid based on the level of exhaust fluid in the second exhaust fluid storage tank. The level of the exhaust fluid in the second exhaust fluid storage tank may be determined based on a level sensor positioned in the second exhaust fluid storage tank or estimated by the controller, for example.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method for a vehicle system, comprising:
   filling a second exhaust fluid storage tank with exhaust fluid from a first exhaust fluid storage tank based on an exhaust fluid level in the second exhaust fluid storage tank, the exhaust fluid level in the second exhaust fluid storage tank is based on a flow of exhaust fluid out of the second exhaust fluid storage tank to an injector and a last reading from a discrete level sensor arranged in the second exhaust fluid storage tank;
   sensing, throughout a range, an exhaust fluid level in the first exhaust fluid storage tank with a continuous level sensor arranged therein;
   determining, based on the sensed exhaust fluid level in the first exhaust fluid storage tank, a maximum fill amount of the first exhaust fluid storage tank;
   adjusting the maximum fill amount, when the ambient temperature is less than a threshold temperature; and
   notifying a vehicle operator of the maximum fill amount.

2. The method of claim 1, wherein the threshold temperature corresponds to a freezing point of the exhaust fluid.

3. The method of claim 2, wherein the vehicle operator is notified via a vehicle display.

4. The method of claim 2, wherein the vehicle operator is notified via a display of a mobile device of the vehicle operator.

5. The method of claim 2, wherein the range extends from a near empty exhaust fluid level to a near full exhaust fluid level.

6. The method of claim 1, wherein the discrete level sensor provides exhaust fluid level readings at predetermined levels and is not a continuous level sensor, and wherein the continuous level sensor is a magnetostrictive level sensor or a resistive chain level sensor.

7. The method of claim 1, wherein the first exhaust fluid storage tank holds a larger volume of exhaust fluid than the second exhaust fluid storage tank.

8. A method for a vehicle system, comprising:
   filling a second exhaust fluid storage tank with exhaust fluid from a first exhaust fluid storage tank;
   receiving an indication of an exhaust fluid level in the first exhaust fluid storage tank throughout a range from a level sensor disposed therein;
   responsive to the indication of the exhaust fluid level and an amount of exhaust fluid supplied from the first exhaust fluid storage tank to the second exhaust fluid storage tank, estimating a consumption rate of the exhaust fluid;
   notifying a vehicle operator of the consumption rate of the exhaust fluid via a wireless communications system;
   determining, based on the indication of the exhaust fluid level in the first exhaust fluid storage tank, a maximum fill amount of the first exhaust fluid storage tank;
   decreasing the maximum fill amount responsive to an ambient temperature less than a threshold temperature, the threshold temperature determined based on a freezing point of the exhaust fluid; and
   notifying the vehicle operator of the maximum fill amount.

9. The method of claim 8, wherein the consumption rate of the exhaust fluid is an average exhaust fluid consumption rate.

10. The method of claim 9, further comprising notifying the vehicle operator of an estimated time to empty of a current exhaust fluid quantity based on the average exhaust fluid consumption rate.

11. The method of claim 8, wherein the threshold temperature corresponds to a freezing point of an exhaust fluid.

12. The method of claim 8, wherein the level sensor in the first exhaust fluid storage tank is a continuous level sensor, and wherein the level sensor in the second exhaust fluid storage tank is a discrete level sensor.

13. The method of claim 8, wherein the estimation of the consumption rate of the exhaust fluid is further based on a duration between subsequent fillings of the second exhaust fluid storage tank.

14. A method for a vehicle system, comprising:
   filling a second exhaust fluid storage tank with exhaust fluid from a first exhaust fluid storage tank based on an exhaust fluid level in the second exhaust fluid storage tank, the exhaust fluid level in the second exhaust fluid storage tank is based on a flow of exhaust fluid out of the second exhaust fluid storage tank to an injector and a last reading from a discrete level sensor disposed in the second exhaust fluid storage tank;
   receiving an indication of an exhaust fluid level in the first exhaust fluid storage tank throughout a range from a continuous level sensor disposed in the first exhaust fluid storage tank; and
   responsive to the indication of the exhaust fluid level, displaying an amount of exhaust fluid to be added to the first exhaust fluid storage tank to a vehicle operator.

15. The method of claim 14, wherein the amount of exhaust fluid to be added to the first exhaust fluid storage tank is displayed on a mobile device of the vehicle operator via a wireless communications system.

16. The method of claim 14, wherein the amount of exhaust fluid to be added to the first exhaust fluid storage tank is displayed on a dashboard of a vehicle of the vehicle system.

17. The method of claim 14, further comprising decreasing the amount of exhaust fluid to be added to the first exhaust fluid storage tank responsive to an ambient temperature less than a threshold temperature.

* * * * *